(12) United States Patent
Chaudhuri et al.

(10) Patent No.: US 6,801,904 B2
(45) Date of Patent: Oct. 5, 2004

(54) SYSTEM FOR KEYWORD BASED SEARCHING OVER RELATIONAL DATABASES

(75) Inventors: Surajit Chaudhuri, Redmond, WA (US); Sanjay Agrawal, Redmond, WA (US); Guatam Das, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 10/032,510

(22) Filed: Oct. 19, 2001

(65) Prior Publication Data

US 2003/0088715 A1 May 8, 2003

(51) Int. Cl.$^7$ ............................................... G06F 17/30
(52) U.S. Cl. ................................................. 707/2; 707/3
(58) Field of Search ................................. 707/2, 3, 10

(56) References Cited

U.S. PATENT DOCUMENTS

| | | | | |
|---|---|---|---|---|
| 5,551,027 A | * | 8/1996 | Choy et al. .................. | 707/201 |
| 5,701,467 A | * | 12/1997 | Freeston ...................... | 707/100 |
| 5,926,820 A | * | 7/1999 | Agrawal et al. ............. | 707/200 |
| 6,122,626 A | * | 9/2000 | Brandsma ....................... | 707/3 |
| 6,505,191 B1 | * | 1/2003 | Baclawski ....................... | 707/3 |

OTHER PUBLICATIONS

Sanjiv Kapoor and H. Ramesh, "Algorithms for Enumerating All Spanning Tress of Undirected and Weighted Graphs", Siam J Comput., vol. 24, No. 2, pp. 247–265, Apr. 1995.

Shaul Dar, Gadi Entin, Shai Geva, Eran Palmon, Data Technologies, Ltd. "DTL's DataSpot: Database Exploration Using Plain Language", Proceedings of the 24$^{th}$ VLDB Conference, New York, USA, 1998, pp. 645–649.

Roy Goldman, Narayanan Shivakumar, Suresh Venkatasubramanian, Hector Garcia–Molina, Stanford University, "Proximity Search in Databases", Proceeding of the 24$^{th}$ VLDB Conference, New York, USA, 1998, pp. 26–37.

Tomas Feder, Rajeev Motwani, "Clique Partitions, Graph Compression and Speeding–Up Algorithms", STOC, 1991, pp. 123–133.

G.J. Minty, "A Simple Algorithm for Listing all Trees of a Graph", IEEE Trans. On Circuit Theory, 1965.

J.D. Ullman, "Principles of Databases and Knowledge–Base Systems", vol. II, Computer Science Press, 1989, pp. 1026–1062.

* cited by examiner

*Primary Examiner*—Jack Choules
(74) *Attorney, Agent, or Firm*—Microsoft Corp.

(57) ABSTRACT

Searching by keywords on a relational database is enabled by performing preprocessing operations to construct lookup tables at an interim level of granularity, such as column location. A keyword search is performed on the lookup tables rather than the database tables to determine database column locations of the keyword. Schema information about the database is used to link the column locations to form database subgraphs that span the keywords. Join tables are to generated based on the subgraphs consisting of columns containing the keywords. A query on the database is generated to join the tables and retrieve database rows that contain the keywords. The retrieved rows are ranked in order of relevance before being output. By preprocessing a relational database to form lookup tables, and initially searching the lookup tables to obtain a targeted subset of the database upon which SQL queries can be performed to collect data records, keyword searching on relational database is made efficient.

42 Claims, 15 Drawing Sheets

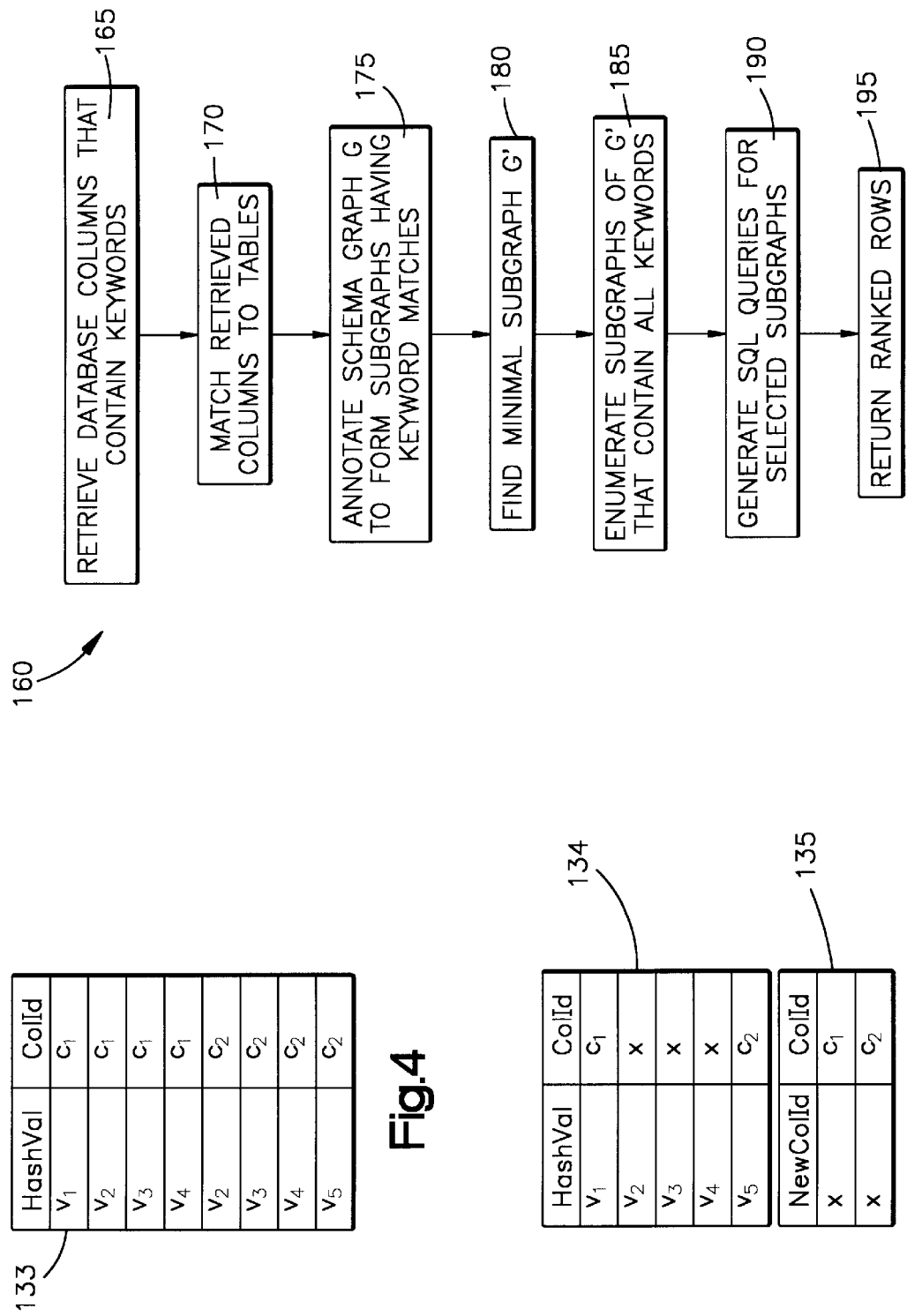

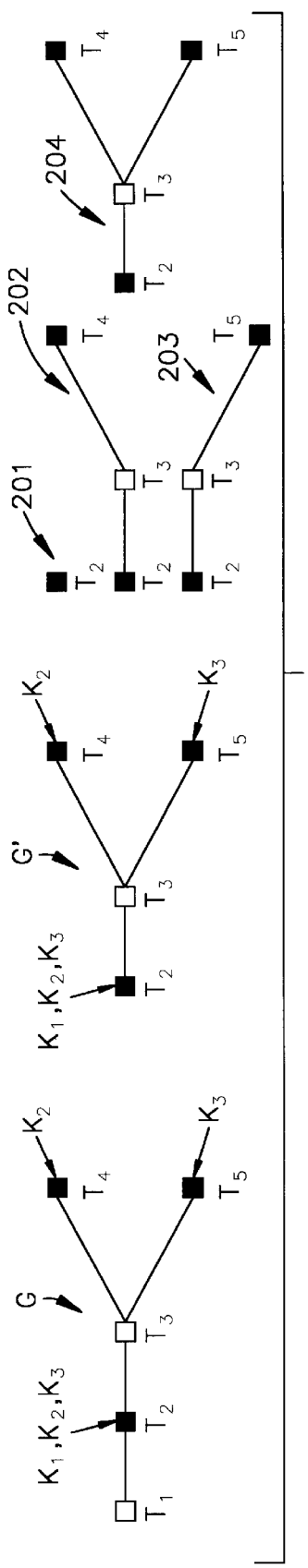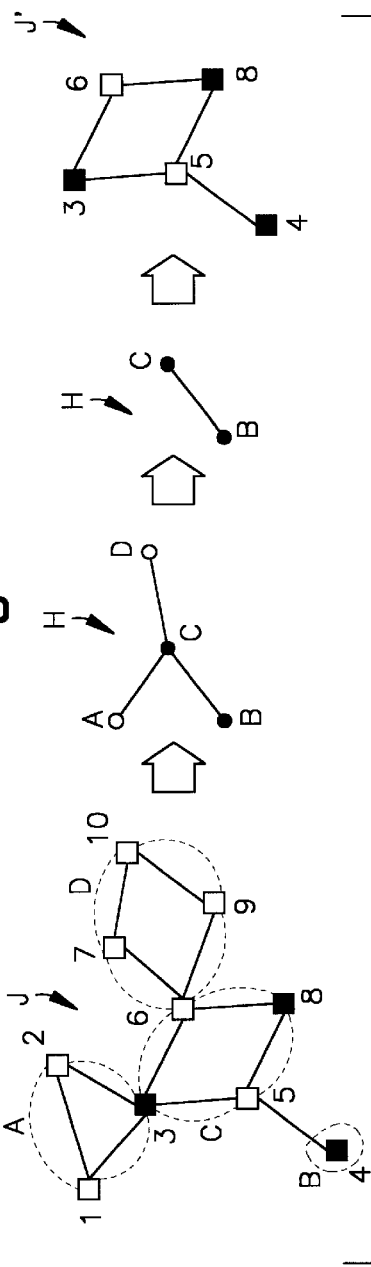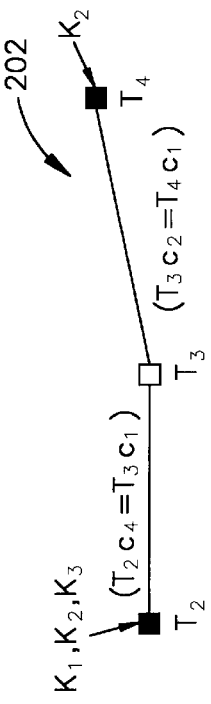
Fig.11
Fig.12
Fig.13

SYSTEM FOR KEYWORD BASED SEARCHING OVER RELATIONAL DATABASES

TECHNICAL FIELD

The invention relates to the field of databases. More particularly, the invention relates to a method of enabling keyword based searches on relational databases.

BACKGROUND OF THE INVENTION

SQL databases are used extensively to store information on intranets. For example, a corporation typically has multiple databases on the intranet to store a variety of information, such as an "address book" or directory of the employees, mailing list information, product, and sales details. The ability to seamlessly access and browse the information stored in these databases is important. Customized applications with front-ends that are closely tied to the schema of the database are used to enable database searching over the intranet. These applications often direct the search in a structured manner.

Structured searches are most effective when the user knows how to get to the information. However, few users are familiar with or willing to learn about the details of the schema of the various databases stored on their intranet. Furthermore, building customized web applications over each database is time consuming. These issues have limited the exploitation of the richness of intranet database information. In the field of document searches, internet search engines have popularized keyword match searches. A user submits keywords to the search engine and a ranked list of documents including a summary is returned. Internet search engines exploit an index over the document collection to enable such a search. The results of a search may retrieve documents that belong to completely different parts of the hierarchy.

While keyword searches are popular in the field of document searches, there is little support for keyword searching over a database or a collection of databases. One approach to enable keyword searching over a database is to duplicate the contents of the database as documents in a middle tier. Traditional text search techniques are then used to perform keyword searches. However, these methods typically have large space and time overheads as well as manageability concerns. In addition, the methods fail to exploit the native query processing functionality of the databases.

Keyword searches are more difficult in databases than in document collections. This is because the database has an inherent structure that may cause the required information to reside in one or more of many tables/columns. Because relational databases can search non-text data and have stored procedures that can support the notion of semantic nearness, in some ways keyword searching can be enhanced through the use of a relational database.

Some common approaches to keyword based searching of text documents are inverted lists, signature files, and prefix trees. One approach to keyword searching of XML documents parses the documents to generate inverted file information that in turn is loaded into a relational database. This approach effectively builds an inverted list that maps values to individual data objects (rows). Because this approach maps at an instance level, it suffers from scalability issues caused by duplication of data that leads to manageability problems.

The work on universal relations treats a database as a universal relation for querying purposes, thus hiding the inherent complexity of schema normalization for the purposes of querying. The challenge in this approach is to map a selection query over the universal relation to a SQL over the normalized schema. However, keyword queries are analogous to specifying universal relation queries without naming the columns involved in the selection conditions. Thus universal relation concepts are not directly applicable to keyword searches over relational databases. "DataSpot" is a commercial system that supports keyword-based searches by extracting the content of the database into a "hyperbase". Subsequently, all keyword searches are made over the hyperbase. Thus, this approach duplicates the content of the database and suffers from the scalability issues already discussed. Most major commercial database vendors allow a full text search engine to be invoked while processing SQL. The full text search capability is invoked by virtue of specialized predicates in SQL that are processed by the full text engine. Since a "hit" using keyword may span multiple tables, full text searching is not sufficient to support keyword search over databases. Furthermore, as already discussed, such engines may encounter serious scalability problems.

SUMMARY OF THE INVENTION

Searching over relational databases can be made more efficient by preprocessing the database to form an index of the data records at an interim level of granularity. The index can be searched to generate a focused query on the database tables that searches only the sets of data records identified in the initial search of the index.

A search of a relational database for data records relating to given search criteria is enabled by creating an index of the data records that maps a record to a region of the database in which it is found. The index is accessed to identify regions of the database that contain data records relating to the given search criteria. A query is constructed that corresponds to the given search criteria and the query is executed on the identified regions of the database to retrieve records matching the search criteria.

To prepare a database to enable searches based on keywords a symbol table is constructed that stores location information for each keyword. The location information may be at a table/column level or at a cell level where a cell corresponds to a particular column in a given row. The symbol table may be constructed by hashing the keywords into a hash table and then compressing the table.

Upon receiving search keywords, the symbol table is searched to identify tables and columns that contain the search keywords. Database subgraphs of the overall schema graph of the relational database that span the set of search keywords are enumerated having nodes that represent tables. The enumerated subgraphs are evaluated to generate queries on the database that select records containing the search keywords. The enumeration of database subgraphs may be based on a schema graph describing a structure of the database tables. The enumerated database subgraphs may be pruned by eliminating leaves that do not contain and of the search keywords. A database query may be generated that joins the tables represented in the database.

BRIEF DESCRIPTION OF THE DRAWINGS

FIG. 4 is an example of a symbol table constructed in accordance with the present invention;

FIG. 5 is an example of a compressed version of the symbol table depicted in FIG. 4;

FIG. 6 is a flow diagram of a search method performed in accordance with the present invention;

FIG. 11 is an example of database subgraph enumeration in accordance with the present invention;

FIG. 12 is an example of database subgraph enumeration in accordance with the present invention;

FIG. 13 is an example of database subgraph construction in accordance with the present invention; and FIGS. 14–21 are user interface displays for preprocessing a database to enable keyword searching in accordance with the present invention.

DETAILED DESCRIPTION OF THE INVENTION

Figure 1:
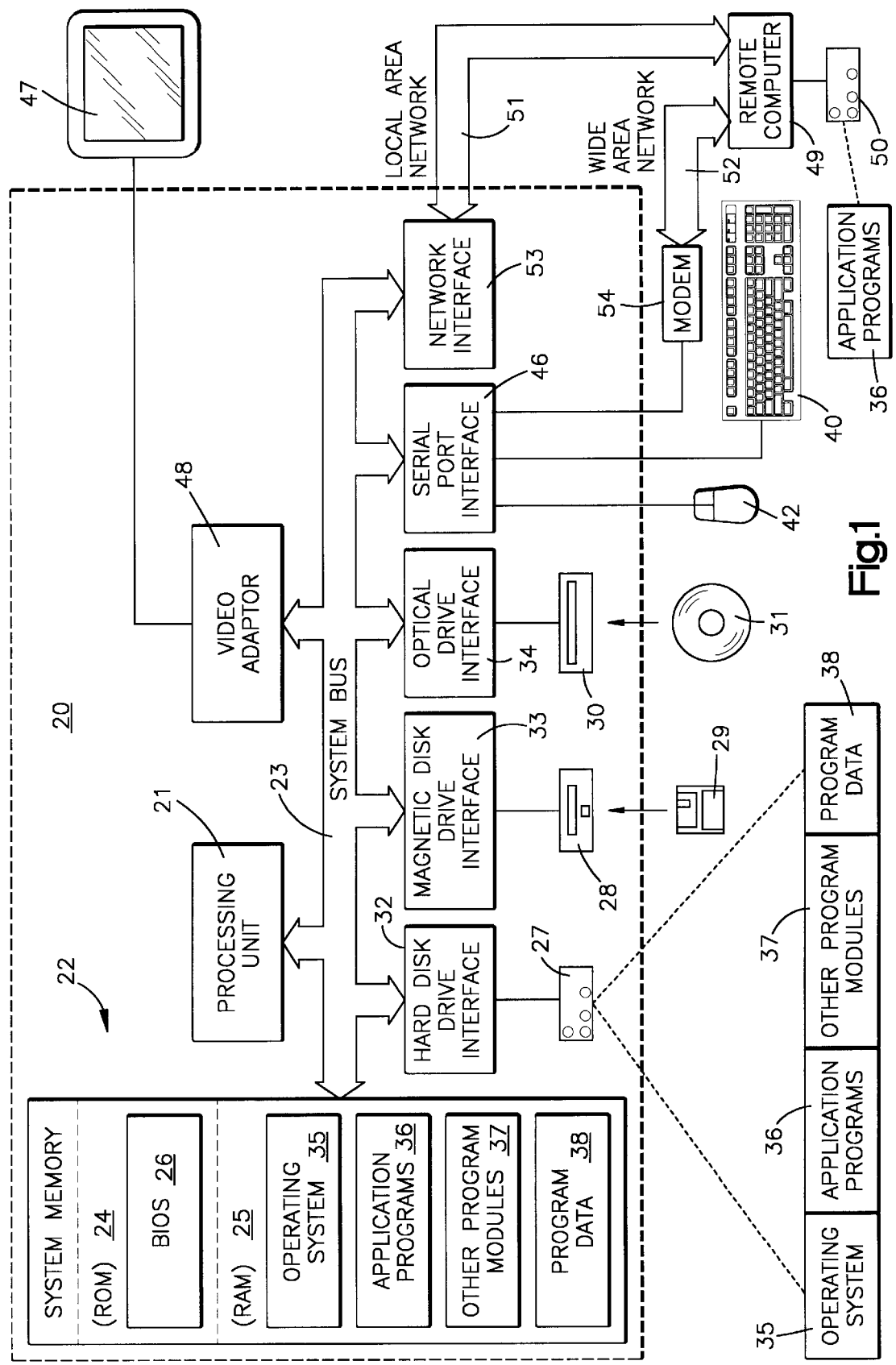
FIG. 1 is a block diagram of an exemplary operating environment for the present invention.
Figure 2:
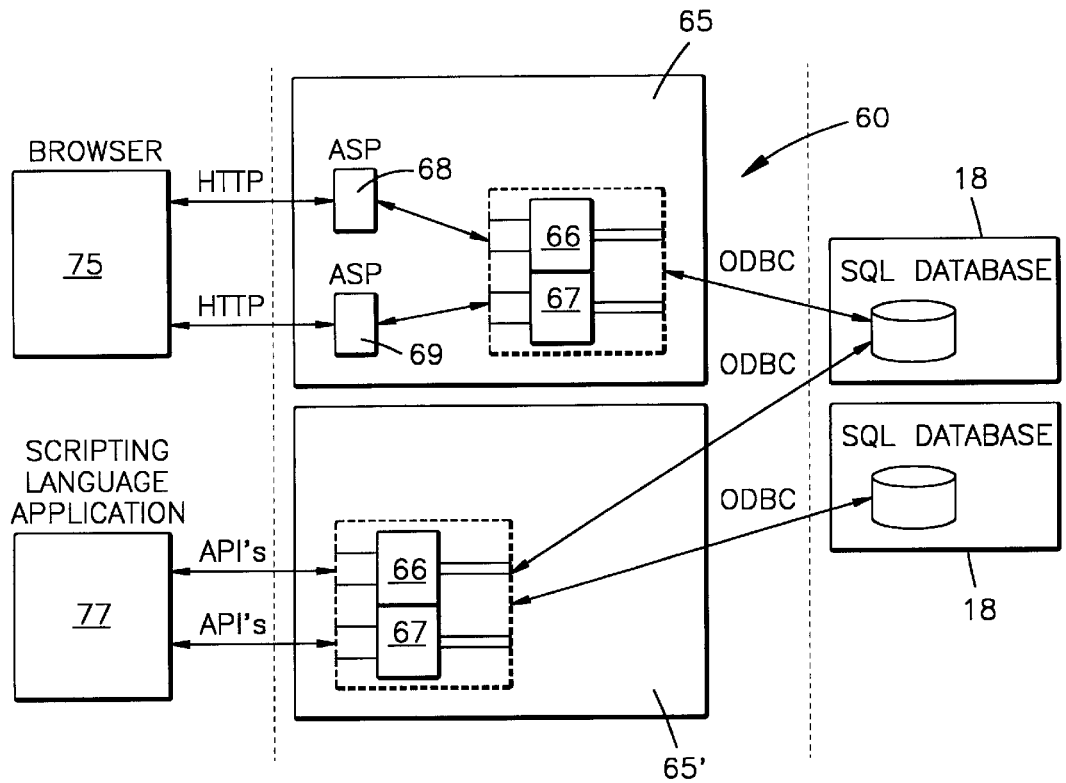
FIG. 2 is a block diagram of a keyword search system in accordance with the present invention.

FIG. 2 is a block diagram of a keyword search system 60 for one or more SQL databases 18. The search system is implemented using a general computing system 20 that is described in detail later in conjunction with FIG. 1. The keyword search system 60 includes a software application 65, such as on a relational database engine SQL, that enables a user to prepare or "publish" a SQL (or any other relational) database to be searched using keywords. The search system 60 also allows keyword searching and browsing on published databases. The software application 65 includes two objects, a publishing component 66 and a search component 67 that can be used in the context of a variety of applications. For example, the system 60 can provide a browser interface 75 with Active Server Pages 68, 69 or a scripting language interface 77.

The publishing component 66 provides interfaces to select a server and database, to restrict a set of tables/columns within the database to publish (to ensure selective publishing of data stored in the database), and to define similarity functions on selected table/columns (to enable creation of domain-specific nearness functions). The publishing component 66 also provides interfaces to modify, remove, or incrementally maintain a publishing. The method employed by the publishing component will be described in detail below.

The search component 67 supports interfaces to retrieve matching databases from a set of published databases for a given set of keywords and to selectively identify objects once a specific database is chosen. The interfaces of the search component 67 include an interface that retrieves all the matching tables/columns for given keyword; an interface that retrieves existing rows in the database that contain all of a set of given keywords or constructs rows on the fly that contain all of a set of given keywords; an interface that retrieves all records that are similar to a particular record on a given column; and an interface that, given a row that might span multiple tables, can navigate to related rows. The method employed by the search component 67 will be described in detail below.

For a search system 60 that features a browser type interface, Active Server Pages are used as a front end for database publishing 68 and database searching 69. The ASPs call the interfaces provided by the corresponding components 66,67. This implementation allows supporting database search and browsing using a web browser. To publish a specific database at the web server, Internet Explorer can be used to execute the publishing ASP 68 and specify the publishing details. While querying, the querying ASP 69 is accessed using a browser and a keyword-based query is issued to get matching databases and/or further search some specific databases for more information. As is depicted in FIG. 2, more than one published database may be simultaneously searched using the search system 60. An alternative search software application 65' is also shown in FIG. 2 that enables access to the publishing and searching components 66,67 using a scripting language such as C++ or VBScript.

Publishing a Relational Database for Keyword Based Searching

Figure 3:
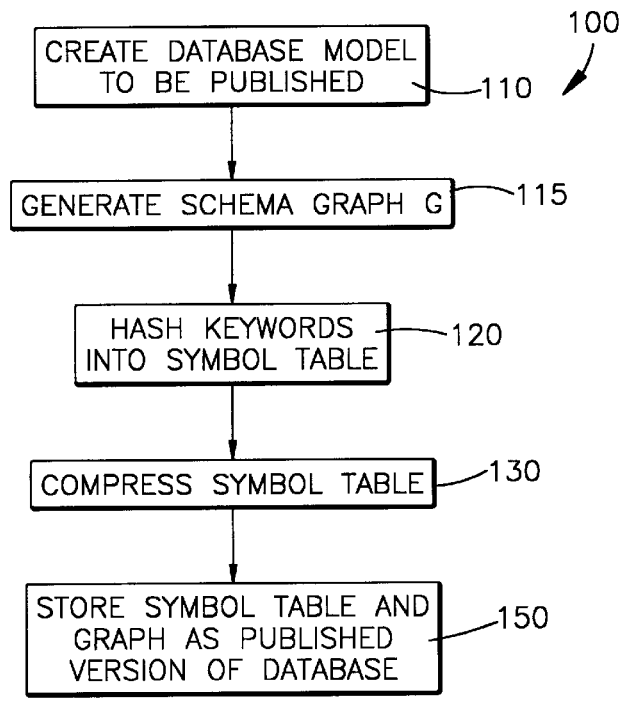
FIG. 3 is a flowchart of a publishing method in accordance with the present invention.

FIG. 3 is a flow diagram of a publishing method 100 employed by the publishing component 66 (FIG. 2). FIGS. 14–21 illustrate example user displays for guiding a publisher through the publishing process. Publishing is a preprocessing step that builds auxiliary structures to prepare a database for keyword search. The database is scanned for schema and content information, and auxiliary indexes are built that enable searches.

Figure 14:
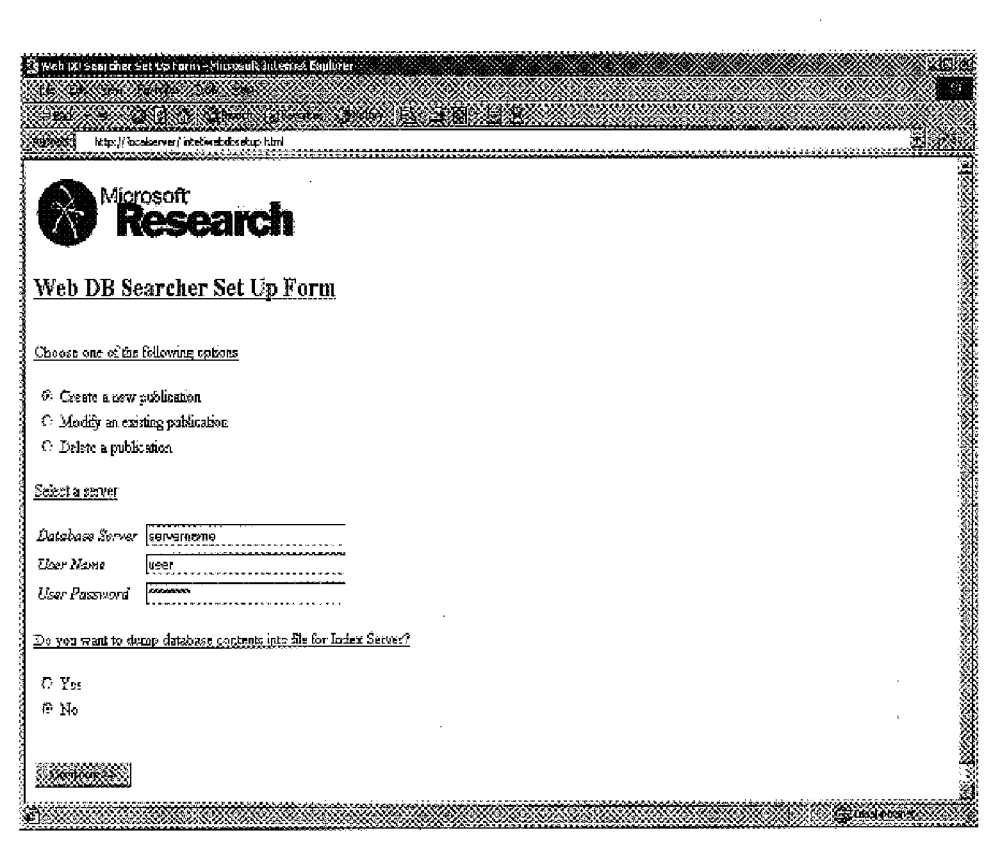
Figure 15:
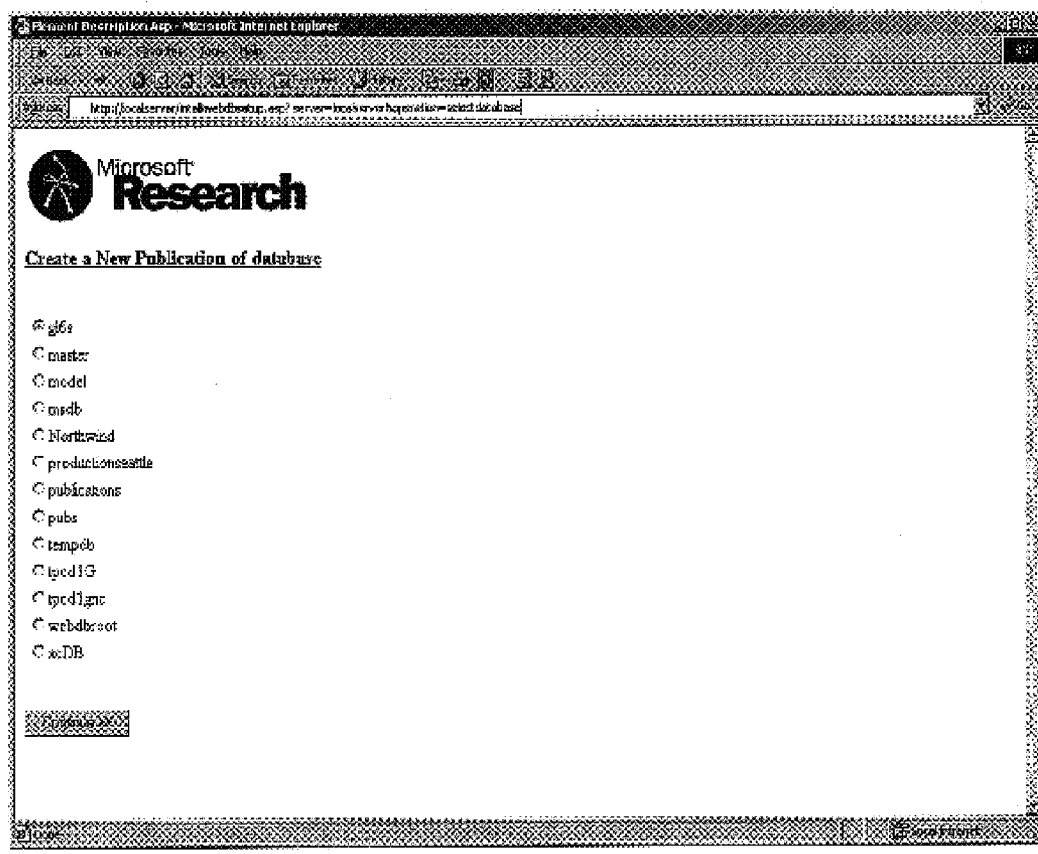
Figure 16:
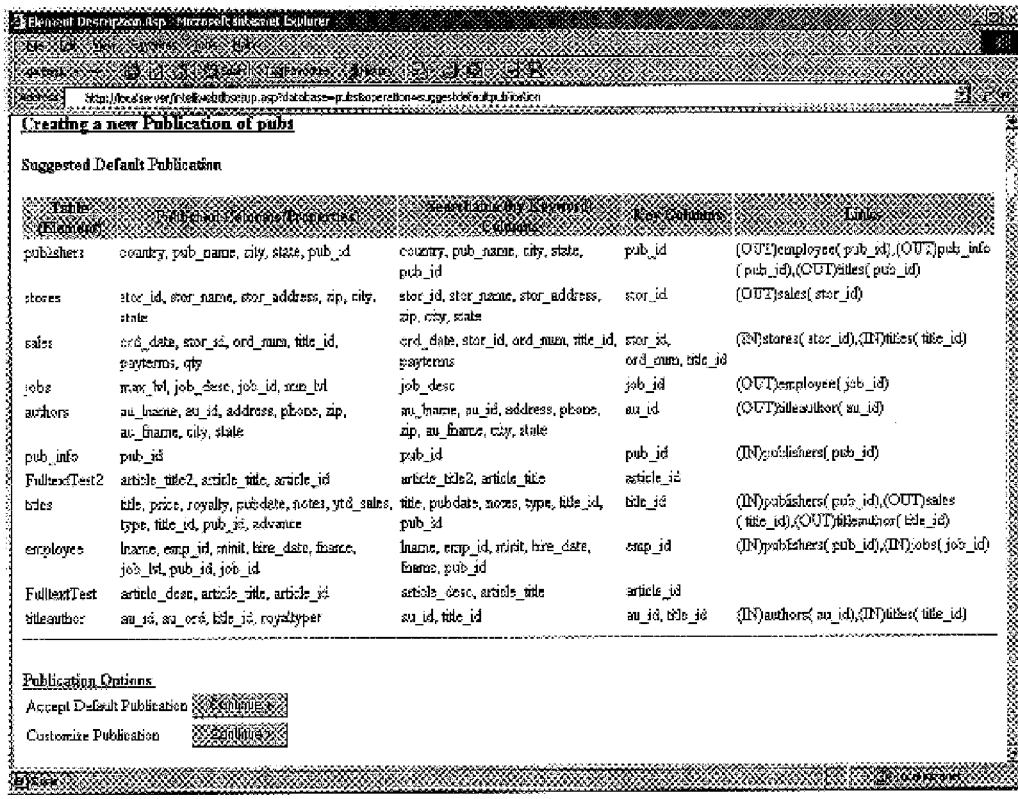
Figure 17:
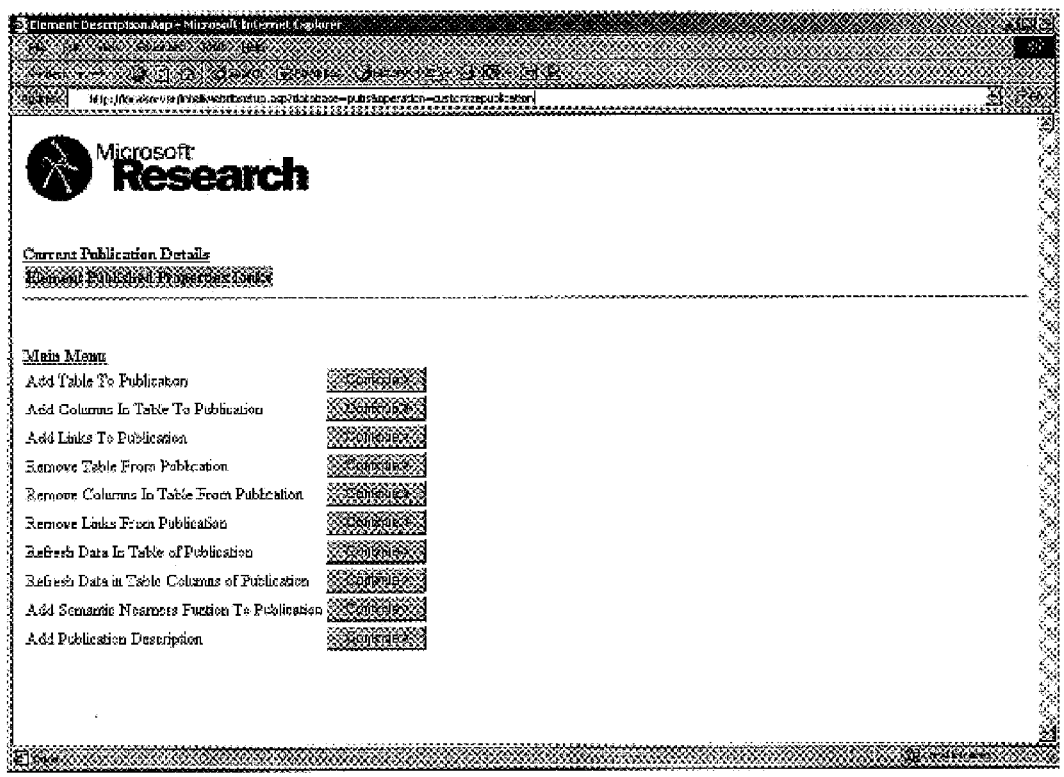
Figure 18:
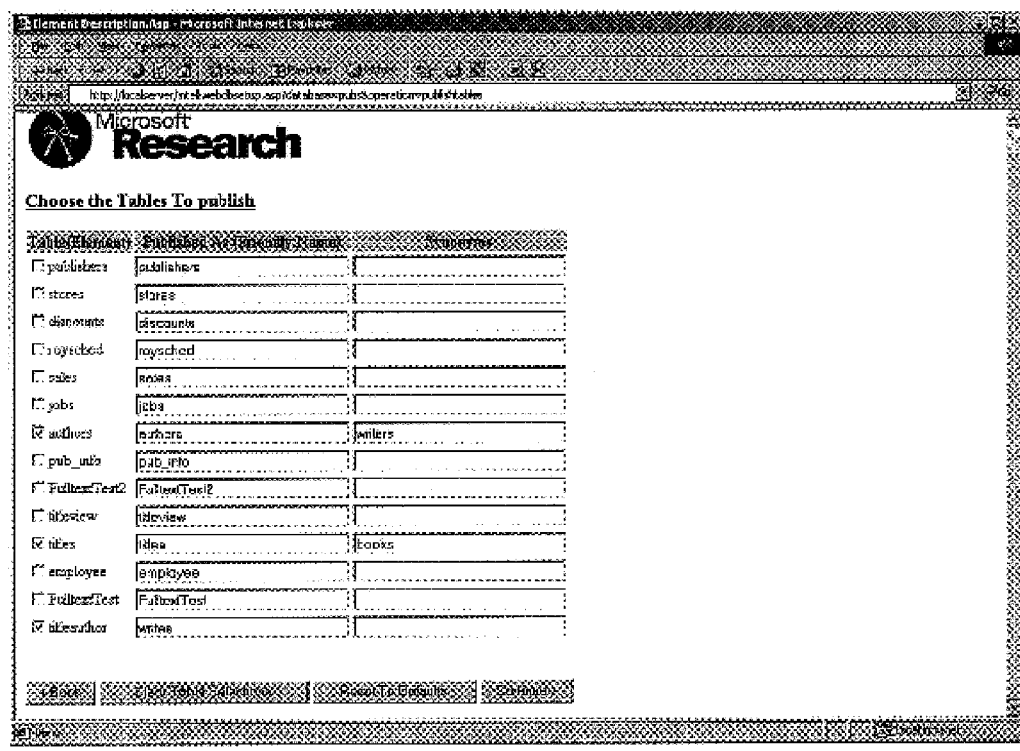
Figure 19:
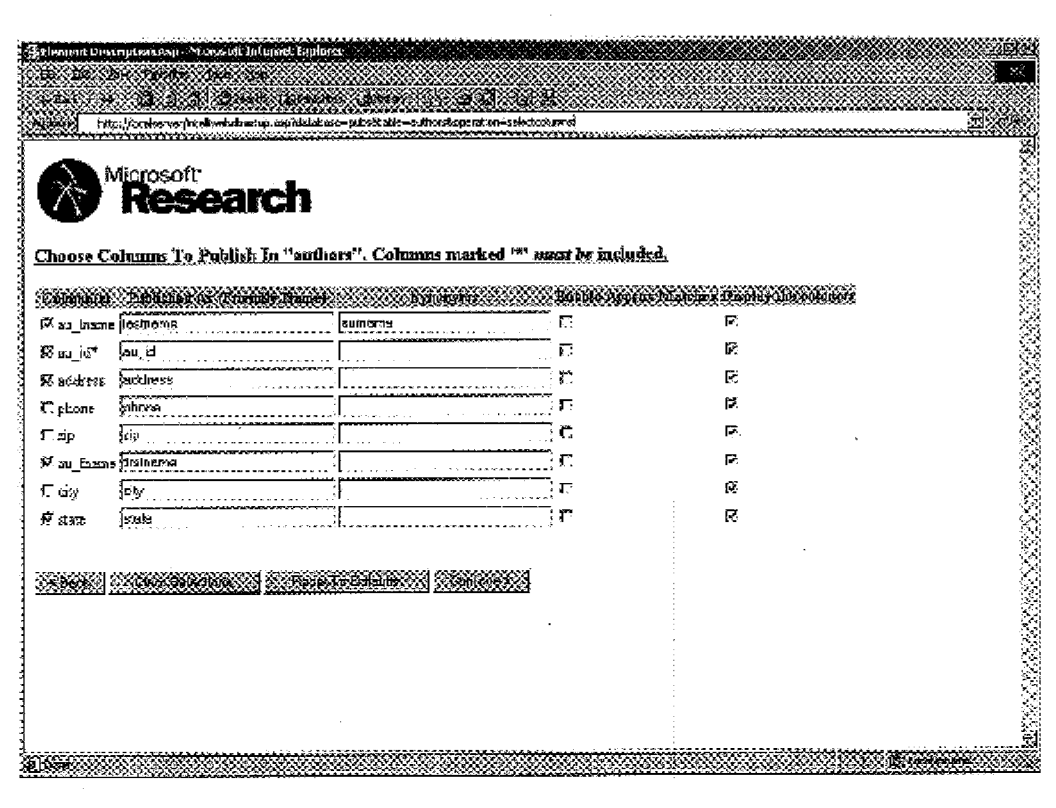
Figure 20:
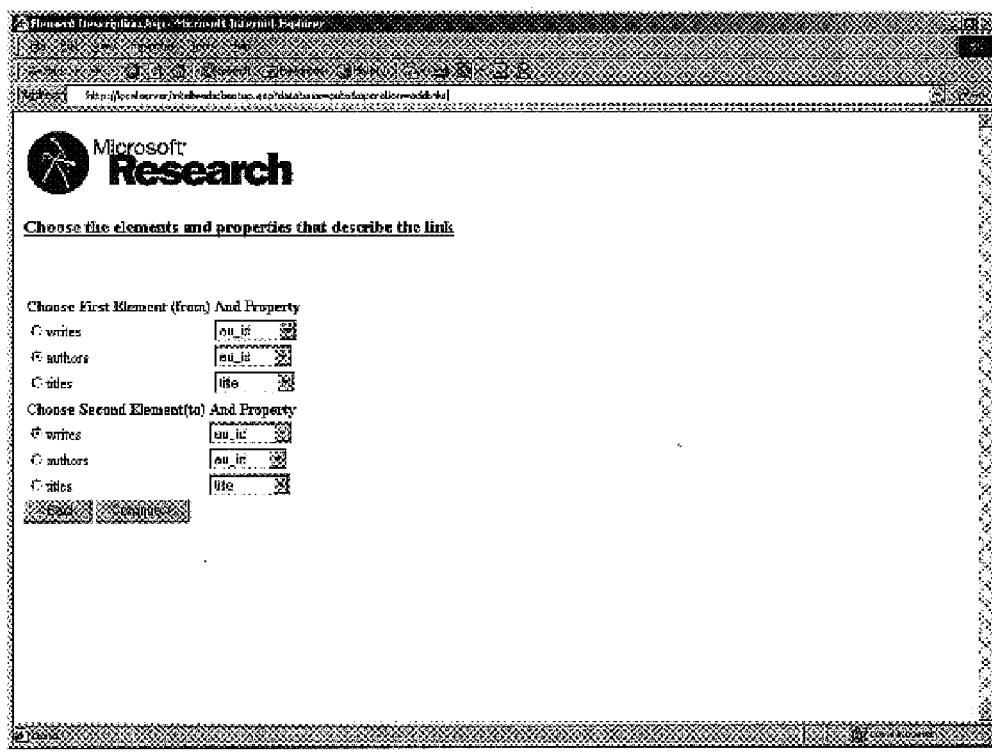
Figure 21:
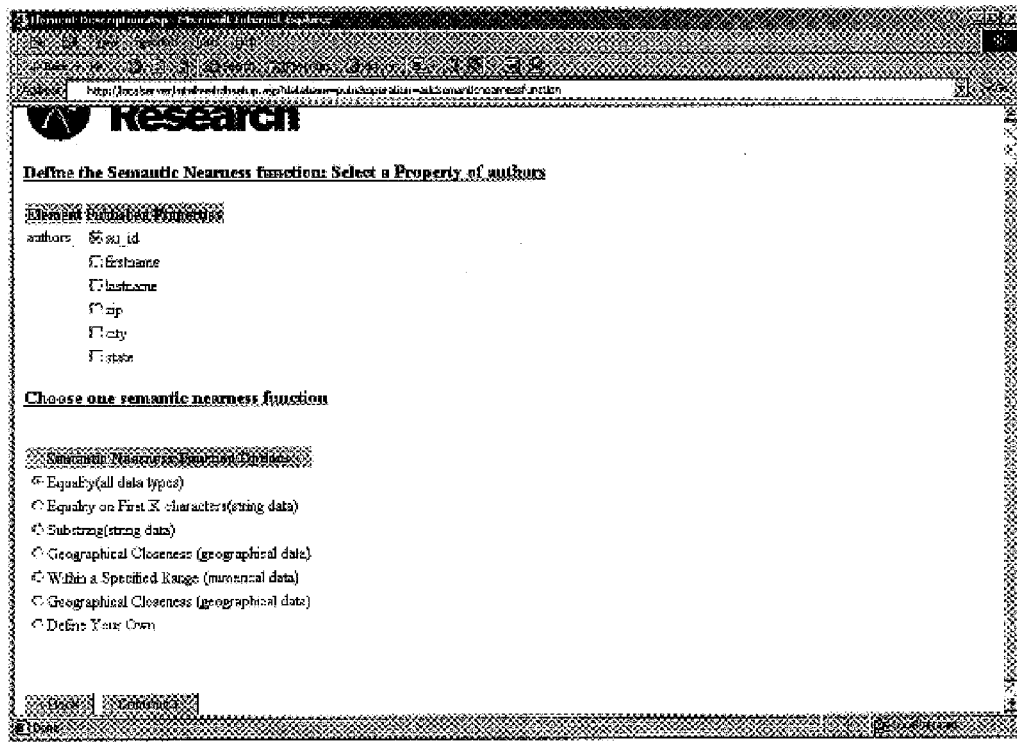

In step 110, the database publisher creates a database model to be published (see FIGS. 14–15 for user interface displays regarding authorization to publish and selection of database to publish). As part of this step (see also FIGS. 16–18) the publisher selects tables and columns that are to be accessible to keyword search (and may choose not to publish some columns, such as those that contain confidential information). As part of the selection process, the publisher defines what information the user sees when a specific database contains a keyword the user is searching for. The information should be chosen to provide sufficient insight into the database contents to allow a user to determine if the database is interesting with respect to his search. The publisher also defines how the published tables are linked (FIG. 20). This allows a user to leverage connectivity information stored during publishing to browse through a database. Domain-based information about semantics, such as a concept of geographic nearness can be associated with columns to enable a user to search for records similar to those retrieved during a keyword search (FIG. 21). The publisher can provide more user-friendly names for columns that will be displayed to the user during a search (FIG. 19). The publisher creates a query user login on the server that has limited permission to access only published data and the auxiliary structures generated during publishing. The query user login is added to the tempdb database that is used to store intermediate results during querying.

As part of the publishing process, a schema graph G is computed from available database schema information in step 115. It is a directed graph where nodes are the tables of the database and the directed edges describe the foreign-key relationships. For example if column C in table T is a primary key in column D in table U and C is a foreign key in table T, then there is an edge from T to U labeled as (T.C=U.D). Each node of the graph G is associated with a set of labels, each label referring to one of the columns in the corresponding table. Thus if the columns in table T are $C_1$, $C_2, \ldots, C_t$, then the set of labels associated with T is $\{T.C_1, T.C_2, \ldots, T.C_t\}$.

In step 120, a symbol table, S, is created with a hashing technique. The symbol table is generated using a relational database engine such as SQL. The symbol table S is used at search time to look up keywords of a query to determine the tables and columns in which they occur. The symbol table is stored as a relational table because it needs to be persisted and because the symbol table can be queried efficiently using familiar techniques. In addition, storing the symbol table as a relational table facilitates concurrency and recovery control. The first step in all keyword searches is to access to symbol table to look up the keywords. Therefore, the speed of the look up process must be maximized. In addition, a compact symbol table is desirable for storage considerations, in particular it is desirable to have a symbol table that can be memory resident and therefore efficient. In order to provide a relatively fast search while keeping the symbol table compact, the table contains keywords and the corresponding database tables and columns in which the keyword can be found. Constructing the symbol table at the column level allows existing indexes on columns to be leveraged during the search. If an index does not exist on a given column, it may be beneficial to store cell location information instead column information as will be discussed below. Although storing the corresponding table row in which a keyword could be found would minimize search time, the table would become large because each keyword may have to be associated with a number of row location pointers. It has been observed that a table having row location information is typically an order of magnitude larger than one having column location information. In addition, listing keywords in the symbol table by row location complicates certain publishing functions such as disabling keyword searching on a given column.

In instances where indexes are not available on all published columns, it may be helpful to have a hybrid symbol table that lists keywords by indexed columns or else cells. For example, if column $C_1$ of table T has an index, while column $C_2$ does not, $C_1$ is published at column level granularity and $C_2$ is published at cell level granularity. If keyword K occurs in four cells: $T.C_1.R_1$, $T.C_1.R_2$, $T.C_2.R_2$, and $T.C_2.R_3$ then K will have three hybrid entries in the symbol table: $(K, T.C_1), (K, T.C_2.R_2)$, and $(K, C_2.R_3)$.

If it is necessary to list keywords at the cell level, it is more efficient to do so by forming a cell "list" instead of a cell "table". In a cell list (CellIdList), the keyword is associated with a variable length column in which a concatenated list of cell locations in which the keyword appears is kept. Because most published columns would likely have an index, this description will focus on the use of a column level symbol table. In addition, maintenance of the column level symbol table is simpler than that of a cell list because the column level symbol table need only be updated when an insertion or deletion changes the values located in a given column. A cell list must be updated with each insertion or deletion of a row and each update involves retrieving the CellIdList corresponding to the keywords in the inserted or deleted rows and then updating the list and the symbol table accordingly.

Instead of keeping keywords directly in the symbol table, a suitable hash function is used to hash the keywords to hash values that are then stored in the symbol table along with the column in which the keyword occurred. The hashed symbol table S is maintained as a persistent relational table with two attributes, HashVal and ColId (each column in the database has been mapped to a unique ColId). Thus if keyword K exists in column c, a row (hash(K),c) is inserted in S. Hashing keywords eliminates the need to store potentially long strings of differing lengths directly in the table and takes advantage of the speed with which SQL can search integers.

In step 130 the symbol table S is compressed using a loss-less compression technique. FIGS. 4 and 5 illustrate the compression technique performed in step 130. FIG. 4 shows the uncompressed hash table 133 in which columns $c_1$ and $c_2$ have several hash values in common. FIG. 5 shows the compressed hash table that results from compressing the table in FIG. 4. A compressed table 134 is constructed having an artificial column x that represents only those hash values that occur in c1 as well as $c_2$, i.e. $\{v_2, v_3, v_4\}$. All six rows in the uncompressed symbol table 133 that have these hash values are replaced with three rows $\{(v_2, x), (v_3, x), (v_4, x)\}$ in the compressed table 134 in FIG. 5. A separate table called ColumnsMap 135 is kept that maintains the column mapping information, i.e. that x represents the conjunction of $c_1$ and $c_2$. The compressed hash table 134 and the ColumnsMap 135 table have a combined total size that is less then the size of the uncompressed symbol table 133. More significant reduction would be achieved if the columns $c_1$ and $c_2$ had many more hash values in common. The compression is loss-less because given a hash value, it is possible to determine the original columns that it belongs to, at the expense of an extra lookup in the ColumnsMap table 135.

To extend the compression technique just described to an arbitrary number of columns, the subset of columns that contain each hash value is computed. For example, let $\{ColId_1, ColId_2, \ldots, ColId_p\}$ be the set of distinct column subsets computed in this manner. HashVal is partitioned into subsets $\{HV_1, HV_2, \ldots, HV_p\}$, where each hash value in $HV_1$, is contained by the column subset $ColId_i$. P new artificial columns are created, $\{x_1, x_2, \ldots, x_p\}$, and appropriate updates to the hash table and the ColumnsMap table are made. To speed up the algorithm and minimize map table size, "uninteresting" columns (such as those whose total contributions to the number of rows in the symbol table is less than $(1-t)*$(number of rows in S), for some threshold parameter $0<t<=1$) are removed from consideration.

Pseudocode for the publishing method 100 with corresponding method step reference characters indicated follows in Table 1:

TABLE 1

Algorithm PUBLISH

Inputs: A database
Outputs: (a) schema graph G, (b) symbol table S and ColumnsMap table

STEP 115

1 Compute G from available schema information
STEP 120

2 Compute hash table S:
Set S to empty
Scan database content, and for each keyword K found in column c
Insert (hash(K), c) in S if it does not already occur in S
STEP 130

3 Compress S:
Set table ColumnsMap to empty
Compute $\{ColId_1, ColId_2, \ldots, ColId_p\}$
Compute $\{HV_1, HV_2, \ldots, HV_p\}$
For i = 1 to p
If $|\ HV_i\ |\ *\ |\ ColId_i\ |\ >\ |\ HV_1\ |\ +\ |\ ColId_1\ |$
Remove from S all entries involving $HV_i$
Create artificial column $x_i$
For each v in $HV_i$ , insert row (v, $x_1$) into S
For each c in $ColId_1$, insert row (c, $x_i$) into ColumnsMap
STEP 150

4 Output G, S, and ColumnsMap

In addition to the symbol table and database schema G, the publishing phase also creates a meta table, a links table, a description table, and a semantic nearness table. The meta table contains information about the publication itself such as the tables and columns that have been published and their "friendly" names. The links table contains information about how the tables/columns are related in the publication schema graph. The description table contains information about the description that the user sees during his query. The semantic nearness table contains information about a stored procedure that is designed to be executed to search for similar records on a given column. The existence of the procedure is registered in the semantic nearness table and the query user login is granted permission to execute the stored nearness procedures. A central registry table stores the names of the tables to avoid collisions with existing tables.

As can be seen from the foregoing description, the publishing method 100 creates auxiliary indexes that enable keyword searching and determines the database schema for use later in answering keyword based queries.

Searching a Published Database

FIG. 6 illustrates a method for searching a published database 160 using keywords. The method 160 is used by the search object 69 shown in FIG. 2. Given a set of keywords, $\{K_1, K_2, \ldots, K_k\}$, the method retrieves all rows from the database that contain all the keywords. The retrieved rows may come from either a single table, or by joining multiple base tables via foreign key joins. The rows are ranked by relevance before being output.

Figure 7:
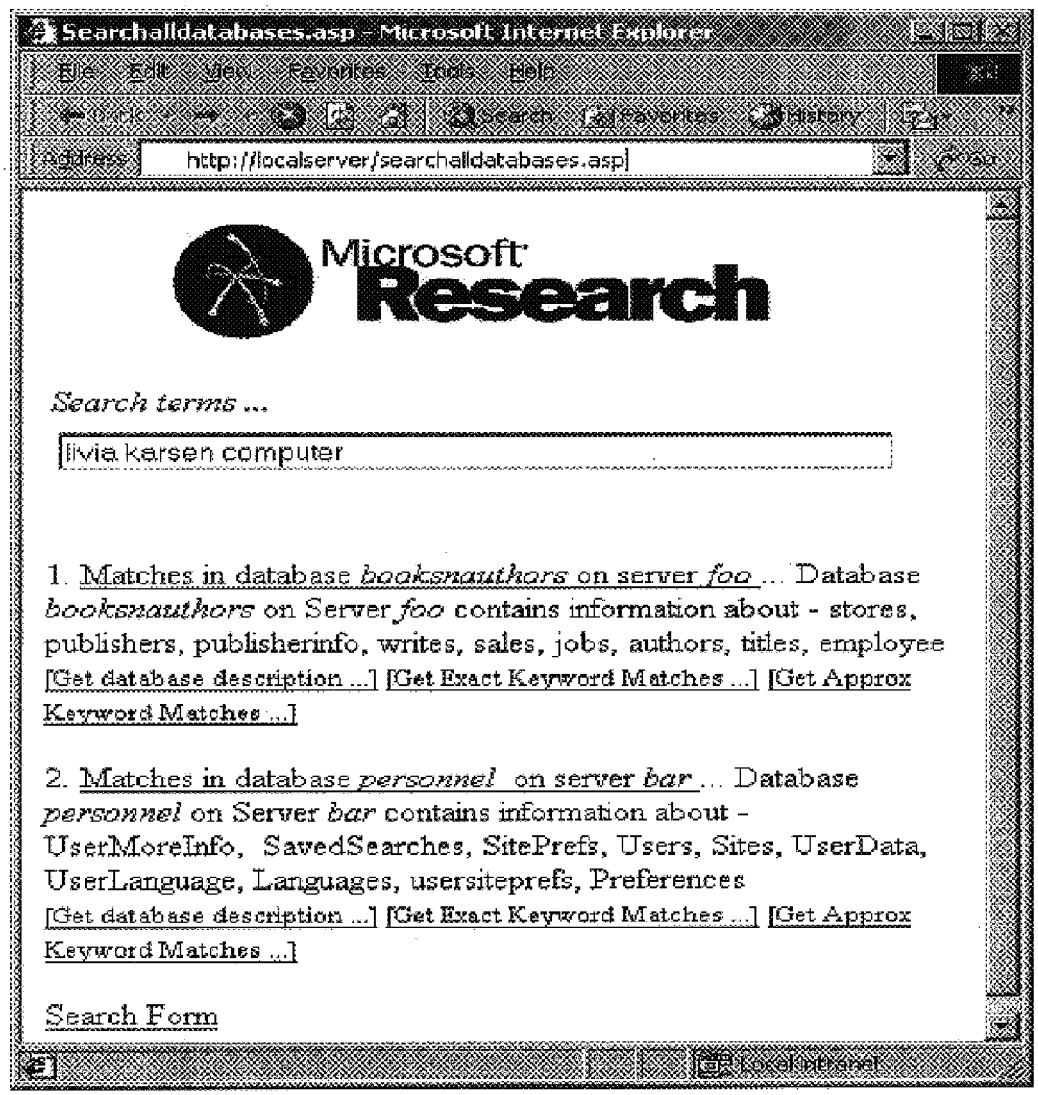
FIGS. 7–10 are user interface displays for performing a keyword search in accordance with the present invention.

In step 165, the method determines which of the published databases contain at least one of the keywords. The method makes this determination by looking up the hashed values of the keywords in the symbol table S and the ColumnsMap table to find databases that contain the keywords. The base tables of the database are not accessed in this step. FIG. 7 illustrates a user interface display that informs the user which databases contain the keywords. Information about the database contents is presented to the user in the form of a list of database column names that may have been modified during the publishing phase to make them more understandable. The user may request additional information about a database or may pursue a keyword search on any of the databases shown by selecting the appropriate option.

Figure 8:
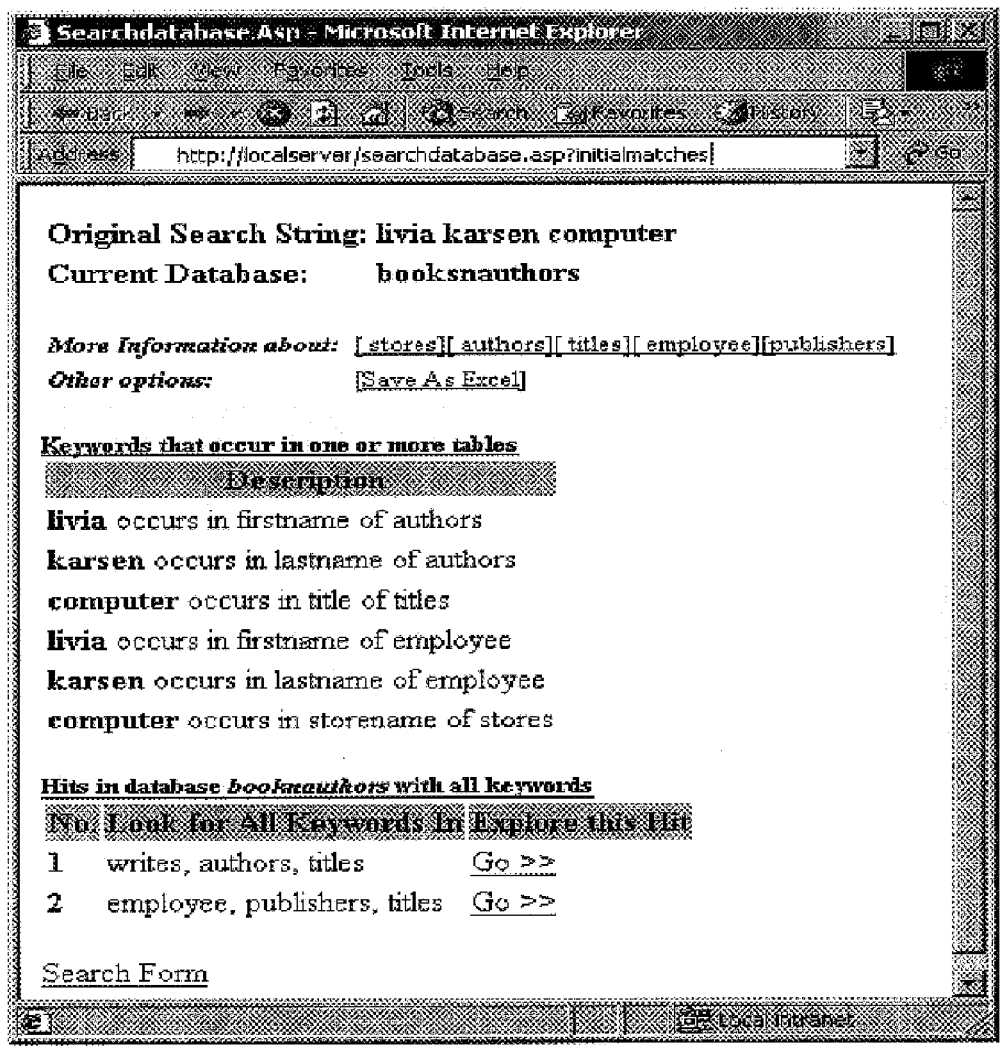

The retrieved columns from the database(s) the user selects to perform a keyword search on are matched to their corresponding database tables in step 170. MatchedColumns=$\{c_1, c_2, \ldots, C_r\}$ is the set of database columns retrieved in step 165 and MatchedTables=$\{T_1, T_2, \ldots, T_s\}$ is the set of database tables to which these columns belong. FIG. 8 shows a user interface display that gives the user information about the database tables in the selected database that contain the keywords. In addition, the user interface shown in FIG. 8 gives hits in the selected database that contain all the keywords.

In step 175, the method annotates the schema graph G that was generated during the publishing phase. As shown in FIG. 11, each node of G is shaded black (or marked) if it belongs to MatchedTables and white otherwise. The graph G shows the foreign-key relationships among five tables. Each black node is annotated with information about which of its columns appear in MatchedColumns and which query keywords are contained in these columns. To expedite the search process, in step 180 a minimum subgraph or G' is computed (also shown in FIG. 11) by removing all unmarked leaves until all remaining leaves are marked to prune the subgraph.

In step 185, a set of subgraphs of G' (or "join trees") that might contain rows having all keywords is enumerated. Treating G' as an undirected graph, subgraphs of G' that satisfy the following two properties are output: (a) the leaves of the subgraph belong to MatchedTables and (b) together, the leaves contain all keywords of the query. Subgraphs that do not satisfy both conditions cannot possibly contain rows having all keywords. Filtering out these subgraphs prevents the method from performing unnecessary joins in its subsequent search of the database base tables.

Assuming the search concerns the three keywords $\{K_1, K_2, K_3\}$, four subgraphs 201, 202, 203, and 204 of G' enumerated in step 185 are shown in FIG. 11. Since $T_2$ may contain rows that contain all three keywords, the single node subgraph 201 is output by step 185. A subgraph induced by $T_2$ and $T_4$ may yield new rows that have all three keywords. Because these subgraphs cannot be joined directly, an intermediate table that allows a join path between them (such as $T_3$) is included in the subgraph 202. The database subgraph induced by $(T_3, T_4, T_5)$ will not be enumerated because joining those three tables will not yield rows having all keywords. Subgraphs 203 and 204 are also output in step 185.

To enumerate subgraphs, for each keyword the set of matching black nodes is identified and the set B that has the smallest cardinality is selected. A separate subgraphenumeration process is initiated from each black node in B. This ensures that a leaf in each of the subgraphs thus enumerated is always a black node. The enumeration process is staged so that first subgraphs having one node are enumerated, then two nodes and so on. Since one leaf of each subgraph is always anchored at a black node, the number of spurious candidates is reduced. Due to efficiency considerations, only small join trees, i.e. subgraphs with at most d nodes (where d is a small constant such as 5 that can be altered during the search) are enumerated.

If the graph contains cycles, such as Graph J in FIG. 12, finding the minimal sub-graphs is more involved. The bi-connected components of J are computed, using standard techniques such as depth-first search (a bi-connected component is a sub-graph in which every pair of nodes is connected by at least two paths that do not share any node). Next, another graph H is created in which there is one node per bi-connected component, and there is an edge between two nodes if the two corresponding bi-connected components are adjacent in J. In general, H will be a forest of trees. Each node of H is marked either black or white; black if the bi-connected component corresponding to the node has a table from MatchedTables, and white otherwise. Next, ears of H are removed by repeatedly removing white leaves, until all leaves are black. Then H is expanded back to J'. The sub-graphs of J' are the minimal sub-graphs that can be enumerated. All database subgraphs in each minimal sub-graph (from J') are enumerated, and then discard those that do not satisfy conditions (a) and (b) described earlier. The problem of enumerating all sub-trees in a graph is an old and well-studied problem in graph theory and this method is a backtracking technique.

Figure 9:
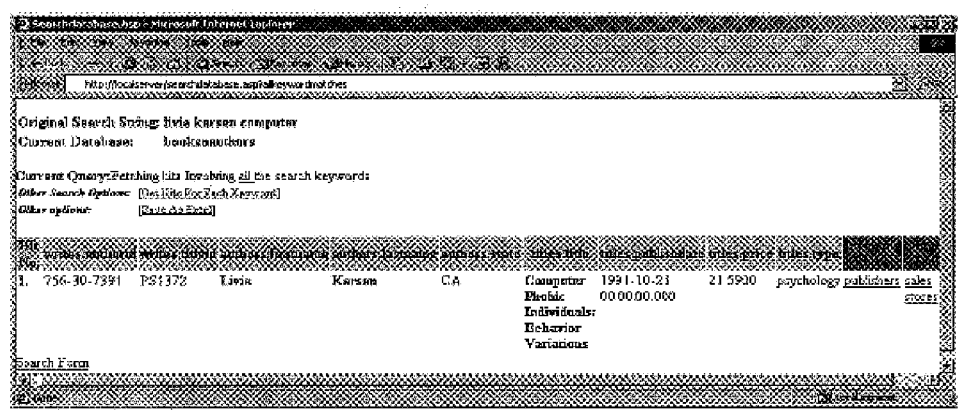

After enumerating subgraphs that contain all the keywords, the method 160 moves to step 190 in which SQL commands are used to search the database at row level. This is the only stage of the method 160 where the database base tables are accessed. The input to this step is the set of enumerated subgraphs/join trees generated in step 185. Every subgraph is mapped to a single SQL statement that joins the tables as specified in the subgraph, and selects those rows that contain all keywords. FIG. 9 is a user interface that displays the selected rows to the user. Referring now to FIG. 13, the subgraph 202 (FIG. 11) induced by the tables $\{T_2, T_3, T_4\}$ is depicted. Let $T_2$ have columns $\{c_1,$ $c_2, c_3, c_4$}, $T_3$ have columns {$c_1, c_2$} and $T_4$ have columns {$c_1, c_2$}. $K_1$, $K_2$, and $K_3$ (the search keywords) occur in $T_2$ in columns $c_1$, $c_2$, $c_3$ respectively. Let ($T_2.c_4 = T_3.c_1$) and ($T_3.c_2$)=($T_4.c_1$) be the two edges of the subgraph and $K_2$ occur on column $c_2$ of column $T_4$ From this subgraph the method retrieves joined rows in which $K_1$ and $K_3$ are from $T_2$ and $K_2$ is from $T_4$. Only combinations where all the leaves of the subgraph are involved are considered. For example, the possibility that all keywords are from the database subgraph $T_2$ is not considered at this time because it will be handled when processing the database subgraph for $T_2$. The SQL statement for the subgraph 201 shown in FIG. 13 is thus:

| | SELECT * FROM $T_2$, $T_3$, $T_4$ | |
|---|---|---|
| WHERE | $T_2.c_1$ = 'K$_1$' | and |
| | $T_2.c_3$ = 'K$_3$' | and |
| | $T_4.c_2$ = 'K$_2$' | and |
| | $T_2.c_4$ = $T_3.c_1$ | and |
| | $T_3.c_2$ = $T_4.c_1$. | |

If, for example, $T_4$ also contained $K_3$ in column $c_3$, the joined rows in which $K_1$ and $K_2$ are from $T_2$ and $K_3$ is from $T_4$ plus $K_1$ is from $T_2$ and $K_2$, $K_3$ are from $T_4$ would be expressed as additional disjunctions in the above where clause.

In step 195, the SQL statements generated in step 190 are executed on the database. The retrieved rows are ranked in order of relevance before being output. Ranking helps the user comprehend what can be voluminous output from the search. The rows are sorted by the number of joins involved and are presented in ascending order. This is because it is believed that rows that are retrieved from joins involving many tables are harder to comprehend. Because the database subgraph enumeration step generates the database subgraph in the order of increasing size, the database subgraph enumeration stage can be pipelined with the row retrieval step, so that upon being created a database subgraph can immediately be scheduled for SQL execution.

Pseudocode for the search method 160 with corresponding method step reference characters indicated follows as Table 2:

TABLE 2

Algorithm SEARCH

Inputs: a query consisting of keywords K1, K2, . . . , Kk
Outputs: all logical rows from the database that contain all the keywords

STEP 165

1. Search for tables and columns:
Look up symbol table S and compute the sets
MatchedColumns = {c1, c2, . . . , cr}
STEP 170

MatchedTables = {T1, T2, . . . , Ts}
STEP 175

2. Search for database subgraph:
View G as an undirected graph
STEP 180

Prune G by ear removal operations to obtain the minimal database subgraph G'

TABLE 2-continued

Algorithm SEARCH

Inputs: a query consisting of keywords K1, K2, . . . , Kk
Outputs: all logical rows from the database that contain all the keywords

STEP 185

Compute database subgraphs in G' using the subgraph-enumeration algorithm
STEP 190

3. Search for rows:
For each database subgraph
Compute SQL statement that joins the tables in the subgraph and retrieves rows that contain all keywords
Execute SQL statements
STEP 195

Rank retrieved rows

Figure 10:
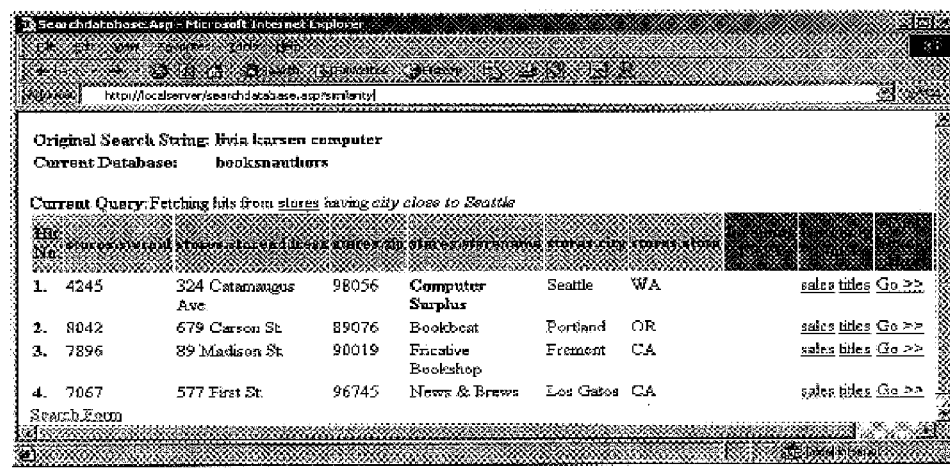

Additional features are available to the user by virtue of the inherent structure and functionality of the SQL database. As already discussed in conjunction with the publishing steps, the concept of similarity native to the underlying relational database can be leveraged to allow a user to search for records similar to a retrieved record. The user selects one column upon which similarity is to be based. If the publisher of the database has provided a similarity function with respect to the selected column (i.e. geographical proximity for a "city" column), the appropriate function is invoked to provide similar records. FIG. 10 illustrates a user interface display in which a user is searching for bookstores near the one retrieved by her search. If no similarity function has been provided, the method may generate a query dynamically using known techniques to return similar records. The user may also take a localized hit and treat it as a set of keywords for querying globally over all the published databases. To provide this global search capability, the method picks up a maximum number of keywords from the current record to issue a global search. The user may also filter the results by limiting the number of columns displayed or by filtering out rows that do not meet a given criteria.

As can be seen from the foregoing description, the search method 160 generates and executes SQL queries only on table/column database subgraphs that are know to contain the keywords thereby reducing the time and cost involved in keyword searches on relational databases.

Computer System

With reference to FIG. 1 an exemplary embodiment of the invention is practiced using a general purpose computing device 20. Such a computing device is used to implement the keyword search system 60 depicted in FIG. 2. The device 20 includes one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29,and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the exemplary embodiments of the invention have been described with a degree of particularity, it is the intent that the invention include all modifications and alterations from the disclosed design falling within the spirit or scope of the appended claims.

We claim:

1. A method that searches a database for data records relating to given search criteria comprising:

creating an index of the data records that maps a record to a region of the database in which it is found;

identifying regions of the database that contain data records relating to the given search criteria by accessing the index and enumerating database subgraphs that span regions that contain the set of search keywords wherein the subgraphs have nodes that represent tables;

constructing a query that corresponds to the given search criteria by evaluating the enumerated subgraphs to generate a query on the database that combines the tables in the subgraph nodes and searches the combined tables to select records containing the search keywords; and executing the query on the identified regions of the database to retrieve records matching the search criteria.

2. The method of claim 1 wherein the given search criteria is a set of search keywords and wherein the database has a plurality of tables having data comprising columns and rows arranged in an database schema and wherein the index is created by constructing an inverted index by creating a list of keywords mapped to the tables and columns in the database in which they can be found.

3. The method of claim 2 wherein the regions of the database are identified by searching the inverted index to identify tables and columns that contain the search keywords.

4. The method of claim 2 wherein the inverted index is created by hashing the keywords into a hash table.

5. The method of claim 2 comprising compressing the inverted index.

6. The method of claim 5 wherein the inverted index is compressed by creating an artificial column designation that represents a combination of columns and a map table that maps the artificial columns to their corresponding combination of columns.

7. The method of claim 1 wherein the database subgraphs are enumerated based on a schema graph describing a structure of the database tables.

8. The method of claim 1 comprising pruning the enumerated database subgraphs by eliminating leaves that do not contain search keywords.

9. The method of claim 1 wherein the query is constructed by generating a database query that joins the tables represented in the database subgraph.

10. The method of claim 1 the query is constructed by generating a database query that selects rows containing the search keywords from tables represented in the enumerated database subgraph.

11. The method of claim 1 comprising ranking the retrieved records based on the number of nodes in the enumerated database subgraph.

12. The method of claim 1 comprising utilizing native database functions to identify records related to the search criteria.

13. The method of claim 12 wherein the native database function comprises a semantic nearness function.

14. The method of claim 1 wherein the index is an inverted index that maps a record to database cell locations in which the record can be found.

15. The method of claim 1 wherein the index is an inverted index that maps a record to database column locations in which the record can be found.

16. The method of claim 1 wherein the index is a cell list that maps a record to a list of database cell locations in which the record can be found.

17. The method of claim 1 wherein the index is created, the database regions are identified, and the query is constructed using SQL commands.

18. A method that searches a database for data records relating to a set of search keywords, wherein the database has a plurality of tables and wherein a table has data arranged in columns and rows comprising:
   constructing an inverted index by creating an list of keywords mapped to the tables and columns in the database in which they can be found;
   searching the inverted index to identify tables and columns that contain the search keywords;
   enumerating database subgraphs having nodes that represent tables that contain the search keywords; and
   retrieving records containing the search keywords by evaluating the enumerated database subgraphs to generate a query on the database that combines the tables and columns identified in the inverted index search and represented in the subgraph nodes and searches the combined tables and columns to select records containing the search keyword.

19. The method of claim 18 comprising pruning the enumerated database subgraphs by eliminating leaves that do not contain keywords.

20. The method of claim 18 wherein the generated database query joins the tables represented in the database subgraph and selects rows containing the search keywords from the joined tables.

21. The method of claim 18 comprising ranking the retrieved records based on the number of nodes in the enumerated database subgraph.

22. In a database management system, a method that identifies keywords among data entries of one or more databases comprising:
   providing a list of one or more candidate databases on which the searching may be conducted;
   identifying from the candidate databases a listing of available attributes for which keyword searching can be performed;
   creating a lookup table for the data entries contained within the listing of available attributes which identifies a source of the data entries by table and attribute within a table;
   publishing a listing of available attributes from the one or more candidate databases on which searching may be performed; and
   prompting the user to enter a search by choosing one or more keywords.

23. The method of claim 22 wherein the keywords chosen by the user are searched in the lookup table to determine if the keywords are contained in the data entries of the available attributes and further wherein a listing of databases contain the keywords is presented to the user.

24. The method of claim 22 wherein there are multiple candidate databases and wherein an interrelationship between database tables is used to form composite data records from different tables in response to a keyword search.

25. The method of claim 22 wherein the interrelationship is in a form of database schema graph and wherein different subgraphs representing parts of the database graph are evaluated based upon a presence of the keywords chosen by the user in the tables that make up the database.

26. In a database management system, a method that generates a query that retrieves records from published columns in the database based on given search criteria comprising:
   forming a database graph having nodes that represent database tables;
   marking graph nodes that contain records that meet the search criteria;
   enumerating subgraphs that span the marked nodes;
   wherein a generated query joins the tables that are present in a subgraph and selects records that meet the search criteria from the join table.

27. The method of claim 26 comprising pruning the database graph by removing leaves that do not contain records that meet the search criteria.

28. The method of claim 26 wherein subgraphs are enumerated by starting with a marked node and adding edges to the node to connect to other marked nodes until all search criteria is contained in the subgraph.

29. The method of claim 28 wherein the number marked nodes in a subgraph is limited to a predetermined threshold.

30. The method of claim 26 wherein the query for a subgraph is generated by forming an SQL query having all the columns from each table in the graph in a select clause, each table in the graph in a from clause, and a where clause having each relationship between nodes, the search criteria, and their corresponding column location.

31. A computer readable medium having computer executable instructions that search a database for data records relating to a given search criteria comprising:
   creating an index of the data records that maps a record to a region of the database in which it is found;
   identifying regions of the database that contain data records relating to the given search criteria by accessing the index and enumerating database subgraphs that span regions that contain the set of search keywords wherein the subgraphs have nodes that represent tables;
   constructing a query that corresponds to the given search criteria by evaluating the enumerated subgraphs to generate a query on the database that combines the tables in the subgraph nodes and searches the combined tables to select records containing the search keywords; and
   executing the query on the identified regions of the database to retrieve records matching the search criteria.

32. The computer readable medium of claim 31 wherein the index is created by constructing an inverted index of data records wherein the inverted index contains a table and column location for each data record.

33. The computer readable medium of claim 31 wherein the search criteria comprises a set of one or more search keywords.

34. An apparatus for searching a database for data records relating to a given search criteria, wherein the database has a plurality of data records arranged in tables having columns and rows comprising:
   a publishing component for creating an index of the data records that maps a record to a region of the database in which it is found; and
   a searching component for accessing the index to identify regions of the database that contain data records relating to the given search criteria by accessing the index and enumerating database subgraphs that span regions that contain the set of search keywords wherein the subgraphs have nodes that represent tables; constructing a query that corresponds to the given search criteria by evaluating the enumerated subgraphs to generate a query on the database that combines the tables in the subgraph nodes and searches the combined tables to select records containing the search keywords; and executing the query on the identified regions to retrieve records matching the search criteria.

35. The apparatus of claim 34 wherein the publishing component creates an inverted list that maps a data record to a table and column location in which the record can be found.

36. The apparatus of claim 34 wherein the search criteria is a set of one or more search keywords.

37. A method that searches a database for data records relating to given search criteria wherein the given search criteria is a set of search keywords and wherein the database has a plurality of tables having data comprising columns and rows arranged in an database schema comprising:
   creating an index of the data records that maps a record to a region of the database in which it is found by creating a list of keywords mapped to the tables and columns in the database in which they can be found;
   compressing the inverted index performed by creating an artificial column designation that represents a combination of columns and a map table that maps the artificial columns to their corresponding combination of columns;
   identifying regions of the database that contain data records relating to the given search criteria by accessing the index;
   constructing a query that corresponds to the given search criteria; and
   executing the query on the identified regions of the database to retrieve records matching the search criteria.

38. A method that searches a database for data records relating to given search criteria wherein the given search criteria is a set of search keywords and wherein the database has a plurality of tables having data comprising columns and rows arranged in an database schema comprising:
   creating an index of the data records that maps a record to a region of the database in which it is found by creating a list of keywords mapped to the tables and columns in the database in which they can be found;
   identifying regions of the database that contain data records relating to the given search criteria by accessing the index and enumerating database subgraphs that span the set of search keywords wherein the subgraphs have nodes that represent tables;
   constructing a query that corresponds to the given search criteria by evaluating the enumerated subgraphs to generate a query on the database that selects records containing the search keywords;
   executing the query on the identified regions of the database to retrieve records matching the search criteria; and
   ranking the retrieved records based on the number of nodes in the enumerated database subgraph.

39. A method that searches a database for data records relating to given search criteria comprising:
   creating an index of the data records that maps a record to a region of the database in which it is found;
   identifying regions of the database that contain data records relating to the given search criteria by accessing the index;
   constructing a query that corresponds to the given search criteria by utilizing a native database semantic nearness function to identify records related to the search criteria; and
   executing the query on the identified regions of the database to retrieve records matching the search criteria.

40. A method for searching a database for data records relating to a set of search keywords, wherein the database has a plurality of tables and wherein a table has data arranged in columns and rows comprising:
   constructing an inverted index by creating an list of keywords mapped to the tables and columns in the database in which they can be found;
   searching the inverted index to identify tables and columns that contain the search keywords;
   enumerating database subgraphs having nodes that represent tables that contain the search keywords;
   retrieving records containing the search keywords by evaluating the enumerated database subgraphs to generate queries on the database to search the tables and columns identified in the inverted index search; and
   ranking the retrieved records based on the number of nodes in the enumerated database subgraph.

41. In a database management system, a method for generating a query that retrieves records from published columns in the database based on given search criteria comprising:
   forming a database graph having nodes that represent database tables;
   marking graph nodes that contain records that meet the search criteria;
   enumerating subgraphs that span the marked nodes by starting with a marked node and adding edges to the node to connect to other marked nodes until all search criteria is contained in the subgraph;
   wherein a generated query joins the tables that are present in a subgraph and selects records that meet the search criteria from the join table.

42. The method of claim 41 wherein the number marked nodes in a subgraph is limited to a predetermined threshold.

* * * * *